(No Model.) 2 Sheets—Sheet 2.
C. STEEL.
SECTIONAL WATER HEATER.
No. 569,360. Patented Oct. 13, 1896.
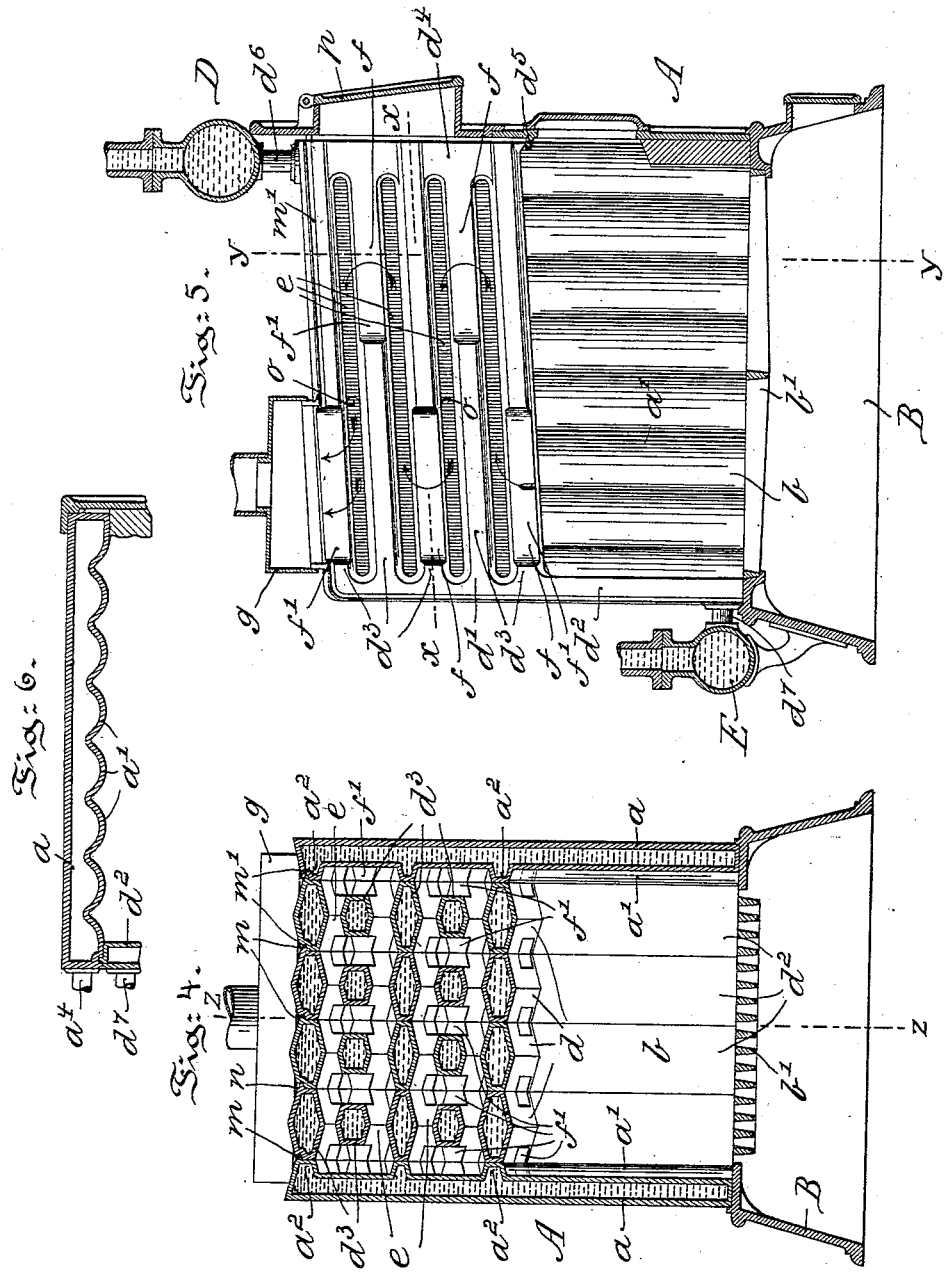

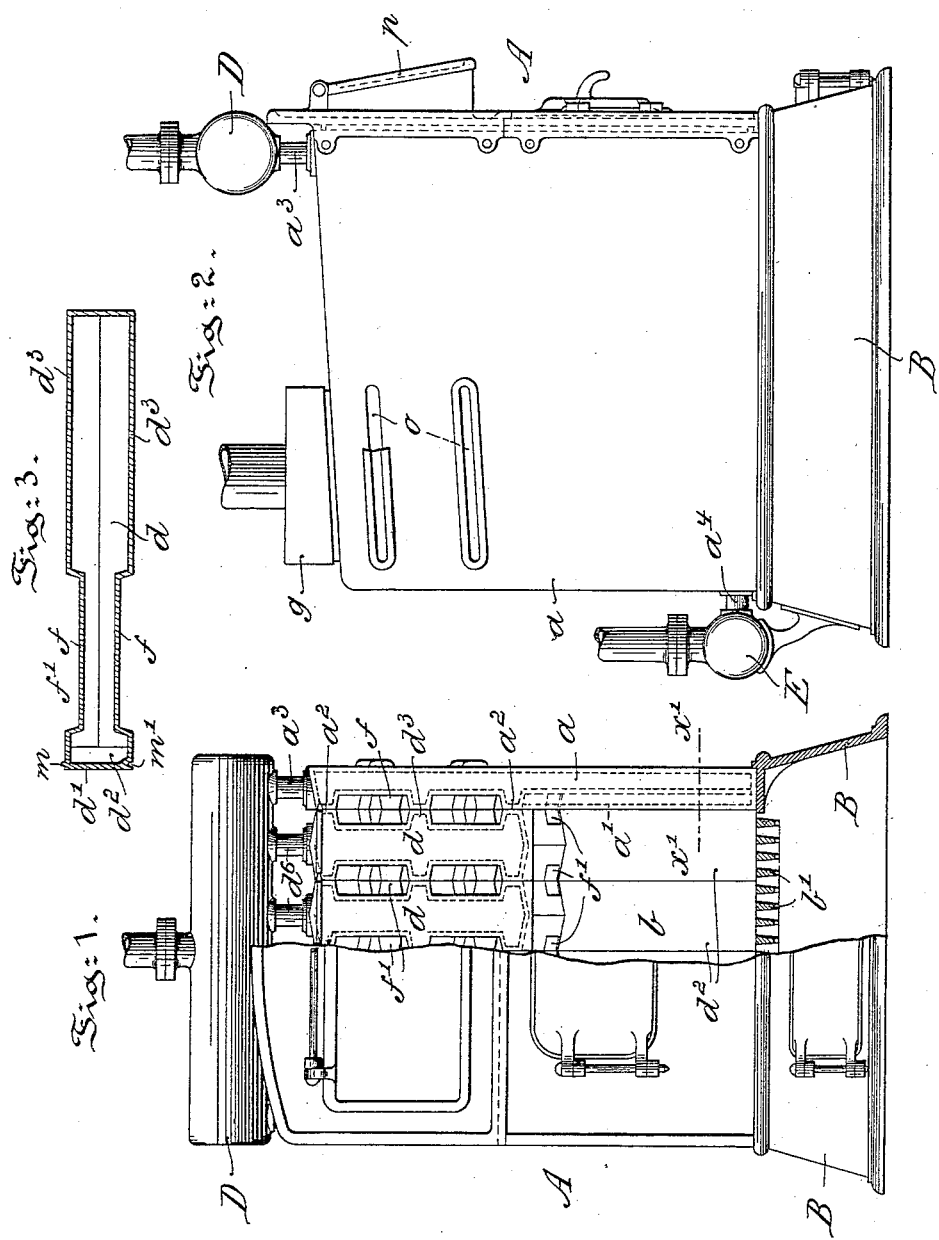

UNITED STATES PATENT OFFICE.

CANBY STEEL, OF PHILADELPHIA, PENNSYLVANIA, ASSIGNOR TO THE GEORGE P. STEEL IRON COMPANY, OF CAMDEN, NEW JERSEY.

SECTIONAL WATER-HEATER.

SPECIFICATION forming part of Letters Patent No. 569,360, dated October 13, 1896.

Application filed February 11, 1896. Serial No. 578,853. (No model.)

*To all whom it may concern:*

Be it known that I, CANBY STEEL, a citizen of the United States, residing at the city of Philadelphia, in the county of Philadelphia and State of Pennsylvania, have invented certain new and useful Improvements in Sectional Water-Heaters, of which the following is a specification.

My invention has relation to a sectional water-heater wherein the water to be heated is conducted through a series of separate sections surrounded by fire-gases, to insure a rapid and thorough heating of the water, and in such connection it relates to the construction and arrangement of such a heater.

The principal objects of my invention are, first, to provide a sectional water-heater of comparatively simple construction, the sections of which may be readily and quickly assembled together or taken apart, each section containing a separate body of water exposed to the fire-gases, whereby a rapid and thorough heating of the water is insured; second, to provide in such a heater a series of separate water-sections arranged in a vertical plane, each section consisting of a front and rear leg connected by a number of branches arranged one above the other and in staggered relation to the fire-box of the heater, said branches being substantially hexagonal or lozenge shape in vertical section, and each branch being contracted or cut out vertically at or near one end, the contracted portions of the branches being in staggered relationship with each other, to thereby form a vertical flue-opening for the passage of fire-gases to and around each branch, and, third, to provide in such a heater side sections having a convoluted or corrugated face at their lower ends and forming two sides of the fire-box.

My invention, stated in general terms, consists of a sectional water-heater constructed and arranged in substantially the manner hereinafter described and claimed.

The nature and scope of my invention will be more fully understood from the following description, taken in connection with the accompanying drawings, forming part hereof, and in which—

Figure 1 is a front elevational view of a water-heater embodying the main features of my invention, a portion of the front or casing being broken away to more clearly illustrate the construction and arrangement of the water-sections. Fig. 2 is a side elevation of the water-heater. Fig. 3 is a section taken on the line $x\ x$ of Fig. 5, illustrating the horizontal configuration of one of the interior water-sections. Fig. 4 is a vertical section on the line $y\ y$ of Fig. 5. Fig. 5 is a transverse section on the line $z\ z$ of Fig. 4, and Fig. 6 is a cross-sectional view of one of the side water-sections on the line $x'\ x'$ of Fig. 1.

Referring to the drawings, A represents the external casing of the heater, supported upon a suitable base B, forming the ash-box of the heater. Upon the base B are also supported the grate $b'$ and the sectional water-chambers, as hereinafter described. At either side of the heater extends a vertically-disposed water chamber or section $a$, the lower portion of which is convoluted or corrugated, as at $a'$, on that face forming the side of the fire-box $b$. The upper end of the side water-sections $a$ is provided with a series of internally-projecting legs $a^2$, upon which the interior water-sections $d$ rest or are supported. The interior water-sections $d$, which in the drawings are shown as four in number, consist severally of a rear vertically disposed member or leg $d'$, the lower portion $d^2$ of which constitutes a portion of the backing of the fire-box $b$, as illustrated in Figs. 4 and 5. From the upper end of this rear vertically-disposed member and in communication therewith extends a series of substantially horizontal branches or legs $d^3$, of substantially the shape or horizontal sectional area shown in Fig. 3 and of substantially hexagonal shape in vertical section. These branches or legs extend from the rear to the front end of the heater and are inclined slightly upward, terminating in a front vertically-disposed leg $d^4$. As shown in the drawings, these horizontal branches or legs $d^3$ are preferably five in number and arranged one above the other and substantially parallel with each other. These branches are separated from each other by a space or channel $e$, constituting a horizontal flue or passage, and each branch $d^3$ is contracted or cut away on both vertical faces, as at $f$, at or near one end of the branch. These cut-away or contracted portions $f$ of the branches are formed at alternate ends of the heater, that is, referring to Fig. 5, the cut-away or contracted portion $f$ of the lowermost branch $d^2$ is located a short distance from the rear end of the heater and rear leg $d'$ of the section, while the contracted portion $f$ of the branch $d^2$ next above the lowermost branch is formed at the front end and extends entirely through the front leg $d^4$, as shown in Fig. 1. The front leg $d^4$ does not extend farther than the lowermost branch $d^3$ and is supported above the fire-box upon a ledge $d^5$, formed in the front wall of the external casing A, as illustrated in Fig. 5.

Inasmuch as each vertical interior section $d$ is formed exactly in the manner hereinbefore described, that is, the branches $d^3$ are all in alinement horizontally and the horizontal channels $e$ pass between said branches from side to side, and inasmuch as the contracted portions or vertical cuts $f$ in the sides of the branches are contiguous, there is formed when the sections $d$ are assembled a series of horizontal flues $e$, superimposed upon one another and connected alternately at the rear and front ends of the heater by a series of vertical flues $f'$, formed by the contiguous contracted portions of the branches $d^3$.

The channels or flues $f'$, formed between the contracted rear ends of the lowermost branches, communicate directly with the fire-box $b$, while at the uppermost branches these vertical channels $f'$ communicate directly with a box and stack $g$, as indicated more clearly in Fig. 5. By this arrangement of flues $e$ and $f'$ the fire-gases, in the passage upward from the fire-box $b$ to the box and stack $g$, are compelled to traverse the branches from rear to front, and vice versa, and to also completely surround or envelop the said branches. The hexagonal shape of the branches exposes a comparatively large fire-surface to the action of the gases for the comparatively small amount of water circulating through the branches. Each water-section $a$ is connected at the top by a pipe $a^3$ with a tank or water-reservoir D and at the bottom by a pipe $a^4$ with another tank or reservoir E; but the two side sections are not connected with each other, save that they both receive water from a common supply-reservoir E and discharge to a common receiver D. In the same manner each interior water-chamber $d$ is connected by a pipe $d^6$ to the receiver D and by a pipe $d^7$ with the supply-reservoir E; but they are not otherwise connected together or to the side water-sections $a$. By providing suitable valves (not shown) on each pipe $a^3$ $a^4$ and $d^6$ $d^7$ any side or interior section may be cut out or into circulation, thus permitting of a decrease or increase of heated water supplied to the receiver D.

The interior sections $d$ are preferably secured together by forming upon one side of the topmost branches of the interior sections a pin $m$, adapted to enter a recess $m'$, formed in the contiguous side of an adjacent branch, as illustrated in Fig. 4. The sections $d$ may in the same manner be secured to the side sections $a$, that is, by forming on the upper leg $a^2$ of one side section a pin $m$, entering a recess of the adjacent interior section $d$, and forming on the upper leg $a^2$ of the other side section a recess $m'$, into which a pin $m$ of its adjacent interior section $d$ is adapted to enter.

Upon the top of the upper branches $d^3$, except at the contracted portions along the point of junction of the same, is preferably spread a layer or layers of concrete $n$ or similar substance to prevent leakage of gases through the top of said branches, except into the box and stack $g$, as clearly illustrated in Fig. 4.

To clean the rear ends of the horizontal flues $e$ there is cut out at each side wall one or more slits $o$, extending through the side water-sections and each communicating with a horizontal flue $e$, as illustrated in Figs. 3 and 5, and there is inserted through these slits $o$ a suitable cleaning-tool adapted to scrape the soot and other matter away from the branches $d^3$ and through the said slits. The front ends of the horizontal and the front vertical flues may be reached for cleaning through the door $p$, located in the front of the heater.

Having thus described the nature and objects of my invention, what I claim as new, and desire to secure by Letters Patent, is—

1. A water-heater, comprising a series of vertically-arranged water-containing sections interposed between two end water-containing sections, the lower ends of which form the sides of the fire-box, each of said vertical and side sections being separately connected at their upper ends with a common water-reservoir and at their lower ends with a second reservoir, said sections being otherwise disconnected from each other, all arranged so that each water-section may be separately filled or emptied without disturbing the other sections, substantially as and for the purposes described.

2. In a sectional water-heater, a water-section consisting of a rear and a front vertical leg, a series of superposed parallel branches substantially hexagonal in vertical cross-section connecting the legs together and extending above the fire-box, each branch provided with a vertically-arranged contraction at or near its end, said vertically-arranged contracted ends being formed alternately at the rear and front end of the successive branches to form vertical flue-openings for passage of fire-gases from the fire-box, substantially as and for the purposes described.

3. In a sectional water-heater, a water-section consisting of a rear and a front leg vertically arranged in the heater, the rear leg forming a portion of the back of the fire-box, and a series of superposed branches substantially hexagonal in vertical cross-section arranged parallel with each other and extended in an inclined horizontal direction over the fire-box, each branch being provided at or near one end with a vertically-arranged contraction to form a flue for passage of gases from the fire-box to and around each branch, and said contracted ends being arranged in staggered relationship, substantially as and for the purposes described.

4. In a sectional water-heater, a water-section consisting of a rear and a front leg vertically arranged in the heater, the rear leg forming a portion of the back of the fire-box, and a series of superposed branches arranged parallel with each other and extended in an inclined horizontal direction over the top of the fire-box, each branch being provided at or near one end with a vertically-arranged contraction to form a flue for the passage of gases from the fire-box to and around each branch, said contracted ends being arranged in staggered relationship in the series of branches of substantially hexagonal shape in vertical cross-section throughout their length, substantially as and for the purposes described.

In testimony whereof I have hereunto set my signature in the presence of two subscribing witnesses.

CANBY STEEL.

Witnesses:
J. WALTER DOUGLASS,
THOMAS M. SMITH.